(12) United States Patent
Bala

(10) Patent No.: US 12,501,361 B2
(45) Date of Patent: Dec. 16, 2025

(54) METHOD AND APPARATUS FOR POWER SAVING FOR EXTENDED REALITY (XR)

(71) Applicant: Rakuten Symphony, Inc., Tokyo (JP)

(72) Inventor: Erdem Bala, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 280 days.

(21) Appl. No.: 18/011,918

(22) PCT Filed: Nov. 14, 2022

(86) PCT No.: PCT/US2022/049755
§ 371 (c)(1),
(2) Date: Dec. 21, 2022

(87) PCT Pub. No.: WO2024/025577
PCT Pub. Date: Feb. 1, 2024

(65) Prior Publication Data
US 2024/0244525 A1   Jul. 18, 2024

Related U.S. Application Data

(60) Provisional application No. 63/393,462, filed on Jul. 29, 2022.

(51) Int. Cl.
*H04W 52/02* (2009.01)
(52) U.S. Cl.
CPC ............... *H04W 52/0216* (2013.01)
(58) Field of Classification Search
CPC .................................. H04W 52/0216
(Continued)

(56) References Cited

U.S. PATENT DOCUMENTS

2013/0155852 A1 *  6/2013  Paredes ............... H04W 28/16
                                                         370/230
2018/0049121 A1 *  2/2018  Yamada ............ H04W 52/0216
(Continued)

FOREIGN PATENT DOCUMENTS

ES        2945965 T3 *  7/2023  ......... H04W 72/232
JP     2020-529764 A    10/2020
(Continued)

OTHER PUBLICATIONS

Dutta, "XR-Specific C-DRX Enhancement for UE Power Saving in 5G NR", dated Dec. 12, 2022 (Year: 2022).*
(Continued)

*Primary Examiner* — Jamaal Henson
(74) *Attorney, Agent, or Firm* — Sughrue Mion, PLLC

(57) ABSTRACT

A method performed by at least one processor in a user equipment (UE) includes monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel. The method includes determining whether a predetermined condition for modifying the monitoring of the downlink channel is satisfied. The method further includes, in response to determining the predetermined condition is satisfied, modifying the monitoring of the downlink channel such that power consumption of the UE is reduced.

20 Claims, 7 Drawing Sheets

(58) Field of Classification Search
USPC .......................................................... 370/311
See application file for complete search history.

(56) References Cited

U.S. PATENT DOCUMENTS

| | | | | |
|---|---|---|---|---|
| 2020/0037396 | A1* | 1/2020 | Islam | H04W 52/0229 |
| 2020/0245395 | A1* | 7/2020 | Zhang | H04W 76/19 |
| 2022/0039017 | A1* | 2/2022 | You | H04W 52/0235 |
| 2022/0191789 | A1* | 6/2022 | Reial | H04W 48/12 |
| 2022/0225233 | A1 | 7/2022 | Jiang et al. | |
| 2022/0361281 | A1* | 11/2022 | Paris | H04W 52/0229 |
| 2022/0386330 | A1* | 12/2022 | Wu | H04W 72/1263 |
| 2023/0034294 | A1* | 2/2023 | Zhang | H04W 52/0216 |
| 2024/0080868 | A1* | 3/2024 | Selvanesan | H04W 72/40 |
| 2024/0389109 | A1* | 11/2024 | Lee | H04W 52/02 |

FOREIGN PATENT DOCUMENTS

| | | | | |
|---|---|---|---|---|
| WO | WO-2022023123 A1 * | 2/2022 | ........ | H04W 52/0219 |
| WO | WO-2023154429 A1 * | 8/2023 | ........ | H04W 52/0219 |

OTHER PUBLICATIONS

International Search Report dated Feb. 22, 2023 from the International Searching Authority in International Application No. PCT/US2022/049755.
Written Opinion dated Feb. 22, 2023 from the International Searching Authority in International Application No. PCT/US2022/049755.
Translation of communication issued Jul. 15, 2025 in Japanese Application No. 2024-549165.
Monderator (Qualcomm Incorporated): Title: "Final Moderator Summary on XR specific power saving techniques", e-Meeting, May 9-20, 2022, 98 pages.
Spreadtrum Communications: "Discussion on XR specific power saving techniques", e-Meeting, May 9-20, 2022, 6 pages.
Qualcomm Incorporated: "Power Saving Techniques for XR", e-Meetings, May 9-20, 2022, 28 pages.
VIVO: "Discussion on XR specific power saving enhancements", e-Meeting, May 9-20, 2022, 15 pages.
Samsung: "Considerations on XR-specific Power Savings", e-Meeting, May 9-20, 2022, 5 pages.

* cited by examiner

METHOD AND APPARATUS FOR POWER SAVING FOR EXTENDED REALITY (XR)

CROSS-REFERENCE TO RELATED APPLICATION(S)

This application is National Stage of International Application No. PCT/US2022/049755, filed Nov. 14, 2022, which is based on and claims priority to U.S. Patent Application No. 63/393,462, filed on Jul. 29, 2022, the disclosure of which is incorporated herein by reference in its entirety.

TECHNICAL FIELD

The present disclosure relates generally to communication systems, and more particularly to methods and apparatuses for power saving for extended reality (XR).

BACKGROUND

Extended Reality (XR) devices and environments are becoming more prominent. XR may refer to various types of augmented, virtual, and mixed environments where human-to-machine and human-to-human communications are performed with the assistance of user devices. These devices may be handheld and wearable devices. XR is an important service that is expected to gather increasing attention in future releases. However, many of the XR devices are expected to have limited battery power resources. Therefore, reduced power consumption of XR devices is desired. One method of power saving is the use of discontinuous reception (DRX). In DRX, the UE is configured with periodic ON durations during which the UE is expected to monitor a physical downlink control channel (PDCCH). When the UE is not in Active Time, the UE can reduce processing to save power (38.321). A wake-up signal whether to monitor the PDCCH in ON duration has been adopted in some releases.

For XR traffic, DRX cycles may not be aligned to XR traffic due to random jitter. The jitter is mainly due to varying time effects at the application (e.g., varying frame encoding delay) and network transfer time. Therefore, packets may arrive outside the DRX ON duration due to jitter. XR may contain multiple traffic flows with different parameters, for example, video and audio packets with different inter-arrival times. One DRX cycle may not align with two traffic flows. Solutions that try to align DRX cycles to packet inter-arrival times may increase UE power consumption.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for power saving for extended reality (XR) are disclosed by the present disclosure.

According to an exemplary embodiment, a method performed by at least one processor in a user equipment (UE) includes monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel. The method includes determining whether a predetermined condition for modifying the monitoring of the downlink channel is satisfied. The method further includes, in response to determining the predetermined condition is satisfied, modifying the monitoring of the downlink channel such that power consumption of the UE is reduced.

According to an exemplary embodiment, a user equipment (UE) includes at least one memory configured to store computer program code, and at least one processor configured to access said at least one memory and operate as instructed by the computer program code. The computer program code includes monitoring code configured to cause at least one of said at least one processor to monitor a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel. The computer program code further includes determining code configured to cause at least one of said at least one processor to determine whether a predetermined condition for modifying the monitoring of the downlink channel is satisfied. The computer program code further includes modifying code configured to cause at least one of said at least one processor to, in response to determining the predetermined condition is satisfied, modify the monitoring of the downlink channel such that power consumption of the UE is reduced.

According to an exemplary embodiment, a non-transitory computer readable medium having instructions stored therein, which when executed by a processor in a UE cause the processor to execute a method that includes monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel. The method includes determining whether a predetermined condition for modifying the monitoring of the downlink channel is satisfied. The method further includes, in response to determining the predetermined condition is satisfied, modifying the monitoring of the downlink channel such that power consumption of the UE is reduced.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
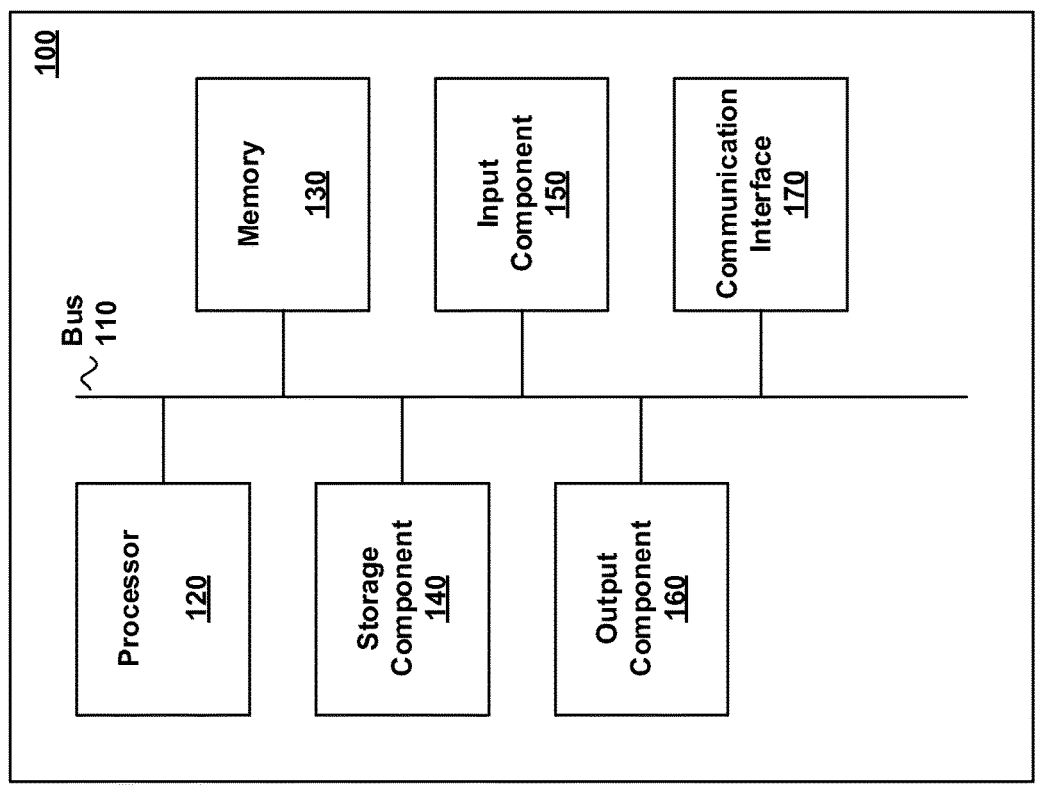
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present disclosure are directed to reducing UE power consumption by reducing PDCCH monitoring by early termination of Active Time, dynamic adaptation of DRX parameters, and enhancements on multi-DRX solutions (e.g., applying PDCCH skipping with multi-DRX, where multi-DRX refers to configuring multiple DRX cycles). The embodiments of the present disclosure result in UE power that improves battery life of a user device.

A DRX cycle may include an on duration time in which the UE is turned on to monitor the PDCCH. This one period may be associated with an on duration timer corresponding to the "ON time" within the DRX cycle. The DRX cycle may further include an inactivity timer that may specify how long the UE remains on after reception of the PDCCH. When this timer is on, the UE may remain in an ON state which may extend the UE ON period into the period which is otherwise OFF. The Active Time or activity timer may refer when the UE is in the ON state (e.g., on duration timer is active or inactivity timer is active).

FIG. 1 is diagram of an example device for performing the embodiments of the present disclosure. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
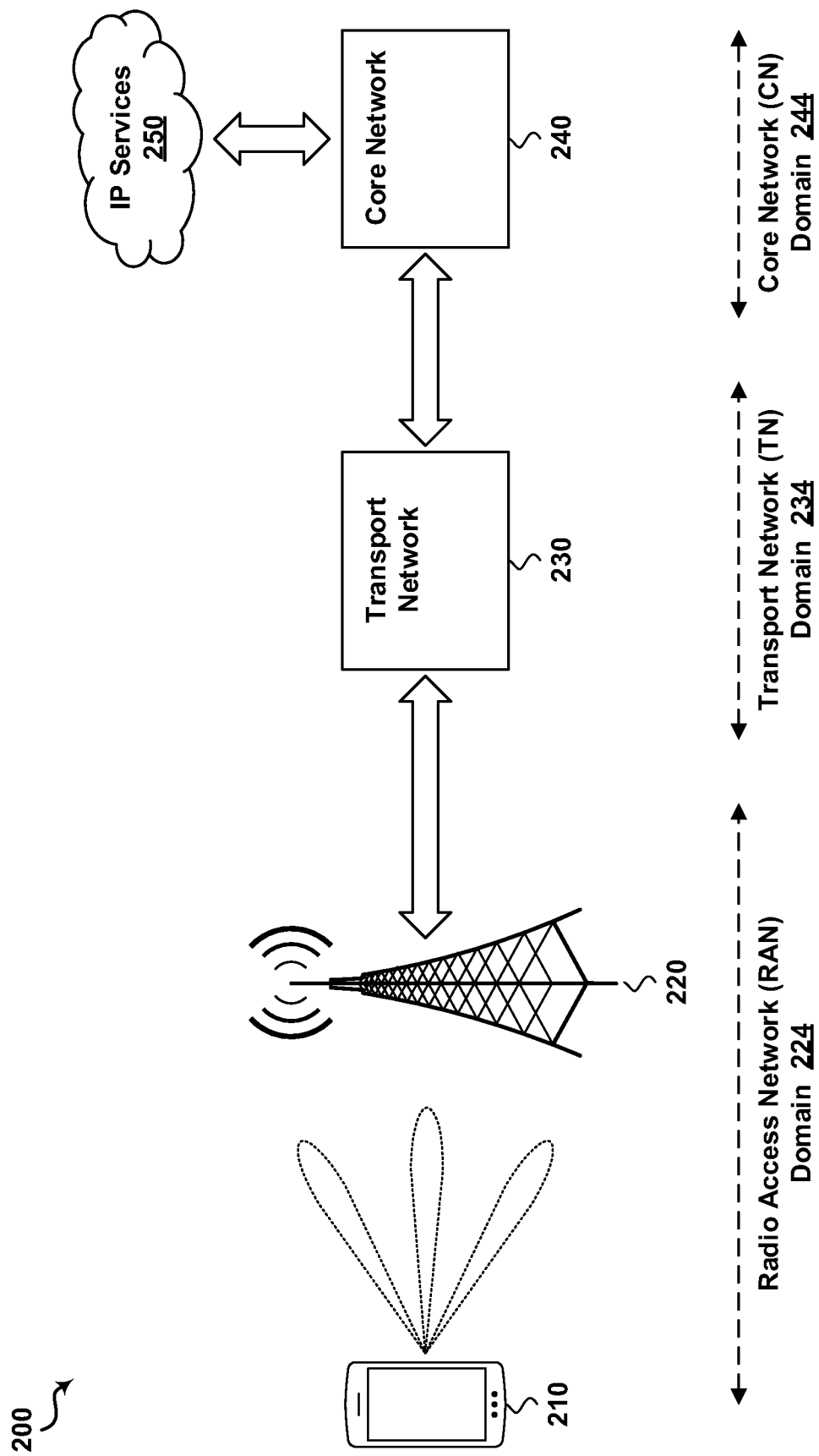
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

UE power saving may be achieved in accordance with various embodiments. In some embodiments, the receiver may terminate receiving and/or monitoring at least one channel (e.g., PDSCH, PDCCH, etc.). In the following, although the receiver may be referred to as a UE or a UE receiver, the embodiments of the present disclosure are similarly applicable to other types of receivers. The termination may be performed by the UE in a time earlier than a time termination was indicated to stop monitoring a channel and/or receiving information in the channel. For example, the UE may terminate monitoring the PDCCH before the end of the Active Time in a DRX cycle. In another example, the UE may terminate receiving the PDSCH before the last symbol and/or slot of the resource allocation.

The indication to the UE to terminate receiving/monitoring a channel may be explicit (e.g., at least by one of by L1 signaling, higher layer configuration, etc.) and/or implicit. In some embodiments, termination may refer to stopping to receive and/or monitor a channel before receiving and/or monitoring all resource elements that were indicated to the receiving node, where a resource element may indicate a resource in time and/or frequency and/or spatial domain. In some embodiments, termination may apply to search spaces monitored in the PDCCH (e.g., the UE may terminate monitoring at least one search space).

In some embodiments, termination may be associated with the Active Time in a DRX cycle where the association may mean that termination refers to the UE ceasing to be in Active Time. In some other embodiments, termination may be associated with the Active Time in a DRX cycle where the association may mean that termination refers to the UE stopping and/or resetting at least a timer associated to the Active Time. In some embodiments, termination may be associated with the ON duration timer and/or the inactivity timer and/or any timer which would indicate to the UE to perform receiving and/or monitoring of at least one channel. The UE may, for example, terminate receiving and/or monitoring of at least a channel while at least one of these timers is running and/or at least one of these timers may be stopped and/or reset.

Figure 3:
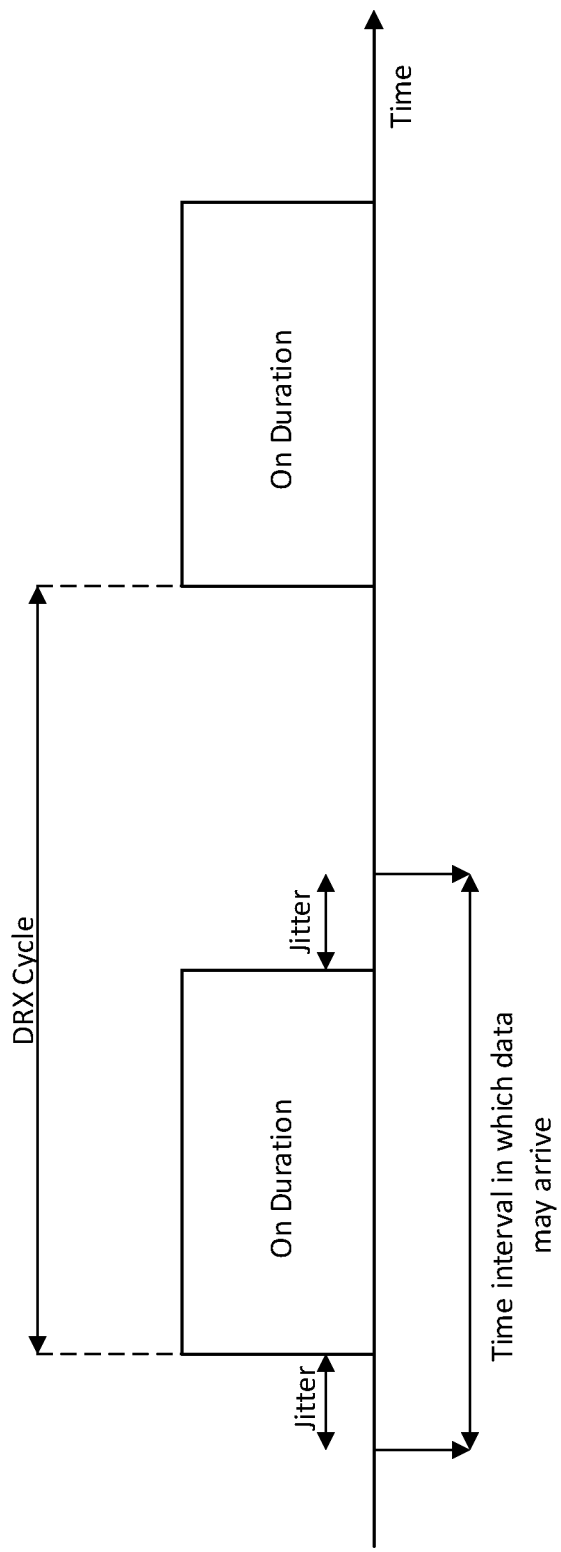
FIG. 3 is an example time sequence diagram of a DRX cycle, in accordance with various embodiments of the present disclosure.

FIG. 3 illustrates an example time sequence 300 where early termination may be used. As illustrated in FIG. 3, a DRX cycle include an ON duration in which the UE is turned on. In FIG. 3, data may arrive outside the ON duration, in the interval denoted as jitter. In some embodiments, the ON duration may be extended to cover the jitter as well and power saving techniques such as early termination may be used to save UE power.

In various embodiments, the UE may be provided an indication to perform termination of monitoring of a downlink channel. In some embodiments, the inactivity timer may be started and/or restarted and/or reset dynamically (e.g., L1 signaling may be used to provide the indication). For example, at least one bit and/or a codepoint in downlink control information (DCI) may be used for this purpose. In some embodiments, the inactivity timer may be activated and/or deactivated dynamically (e.g., using L1 signaling and/or a MAC CE). The activation/deactivation indication may be applicable in the current DRX cycle in which the indication is received. The activation/deactivation indication may also be application in a future DRX cycle. Deactivation may refer to setting the inactivity timer to zero. Activation may refer to setting the inactivity timer to a value other than zero.

In some embodiments, the value of the inactivity timer may be changed dynamically, for example, using at least one of L1 signaling, a MAC CE, higher layer configuration. For example, a higher layer configuration may set the inactivity timer to a fixed value. A MAC CE may be used to indicate a set of values for the inactivity timer. The L1 signaling (e.g., a codepoint in a DCI), may indicate one value out of a set of values indicated by the MAC CE. In some embodiments, while the timer is running, the value of the inactivity timer may be changed based on the occurrence of an event (e.g., the timer skips). For example, the inactivity timer may start running at 20 ms. When the timer is at 16 ms, PDCCH is received and/or DCI is decoded: the timer may skip 5 ms and continue running from 11 ms. In some embodiments, the setting of the timer to a different value may be performed only when the number of resources (e.g., slots), scheduled by the DCI is above a threshold, and/or a specific RNTI is used. The above embodiments may apply to other timers as well. For example, these embodiments may apply to the ON duration timer. In some embodiments, a timer may be configured such that once the timer starts, the timer is not reset until the timer runs out.

In some embodiments, the value of the ON duration timer may reduce with a successful DCI reception in the PDCCH. These embodiments may be applicable for a certain set of RNTIs, search spaces, DCI type, etc. In other embodiments, the value of the ON duration timer may reduce with successful reception of data transmission scheduled dynamically or semi-statically. For example, the ON duration timer may be set to 10 ms when the timer starts. When the timer is at 7 ms, scheduled data is received. After reception of this data, the timer may skip 2 ms and continue running from 5 ms. How much the value of the timer reduces may be configurable. The change in value of the timer may be dependent on the number of time units (e.g., slots) left in the ON duration after reception of a channel such as the PDCCH or the PDSCH. For example, the ON duration timer may be set to a smaller value if the number of slots left in the ON duration after the successful decoding of PDCCH is above a threshold. In other embodiments, the change in value of the timer may be dependent on the number of resources allocated with a DCI. For example, if the DCI allocates a group of slots and the number of slots in the group is above a threshold, the ON duration timer may be set to 0 after all slots are received successfully. The above disclosed embodiments may apply to other timers as well such as the inactivity timer.

In some embodiments, the Active Time termination may be determined by the UE, for example when certain conditions hold. As an example, the Active Time may be terminated if the number of bits scheduled and/or successfully received during the Active Time or in the current DRX cycle is above a threshold, and/or the total number of time and/or frequency resources scheduled during the Active Time or in the current DRX cycle is above a threshold. In other embodiments, the UE may determine to switch to a new set of search spaces when these conditions hold.

Figure 4:
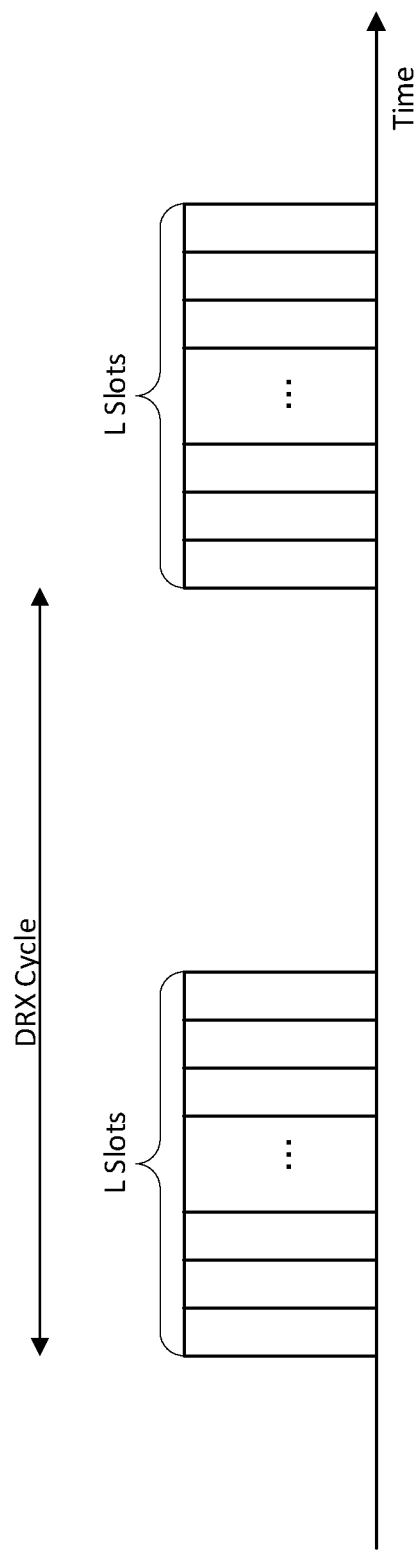
FIG. 4 is an example time sequence diagram of a DRX cycle, in accordance with various embodiments of the present disclosure.
Figure 5:
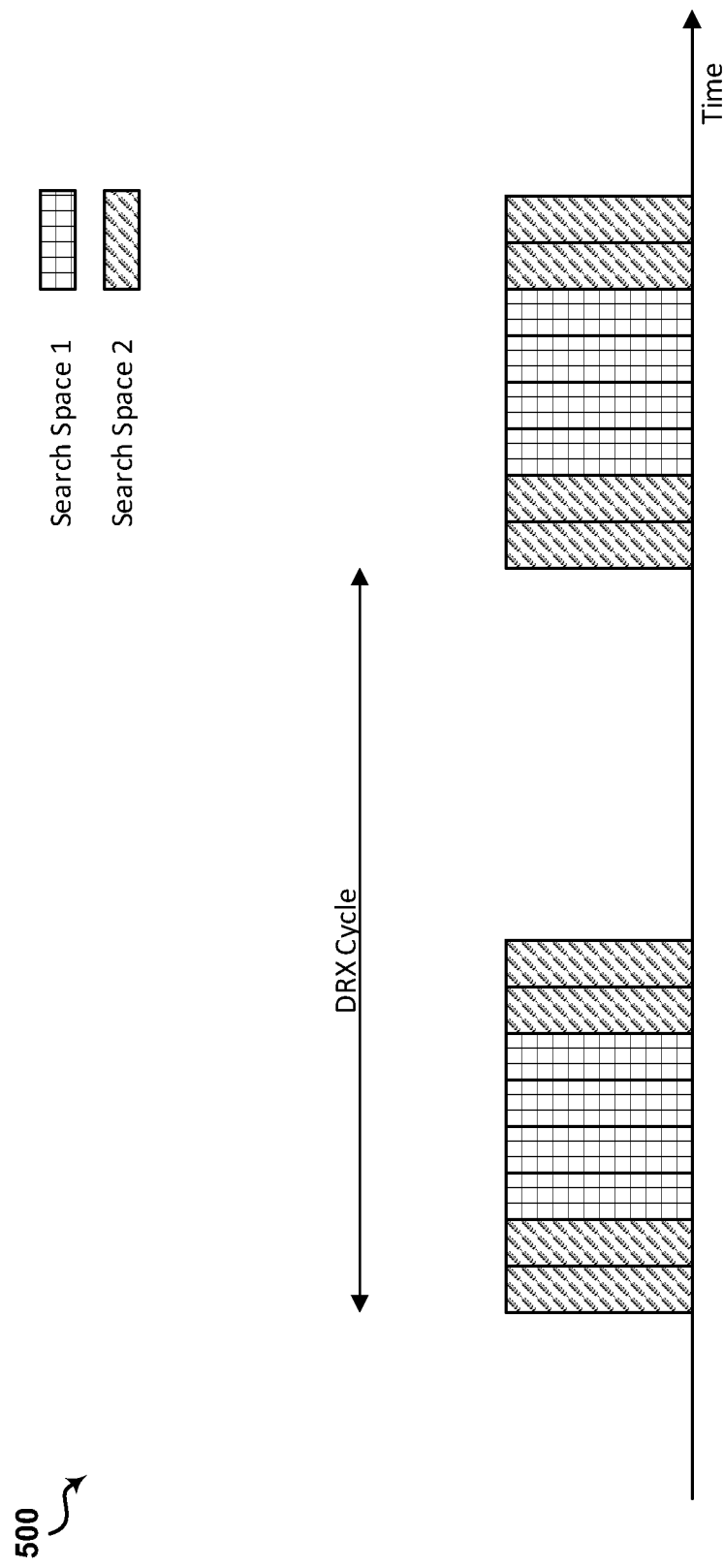
FIG. 5 is an example time sequence diagram of a DRX cycle, in accordance with various embodiments of the present disclosure.

In some embodiments, separate sets of search spaces may be monitored during the ON duration. Under certain conditions, for example when there is jitter in the system, the probability of transmission in some slots in the ON duration may be less than the probability of transmission in some other slots of the ON duration. For example, it may be less probable to receive a transmission in the slots at the edges of the ON duration. FIG. 4 illustrates an example time sequence 400 in which during a DRX cycle, the ON duration is split into L slots. As an example, each slot may correspond to an equal amount of time. In some embodiments, the UE may monitor PDCCH in slots at the edges of the ON duration with a first search space set and the UE may monitor the PDCCH in the remaining slots with a second search space set. FIG. 5 illustrates an example in which an ON duration is split into two different search spaces (e.g., Search Space 1 and Search Space 2). In some embodiments, the slots in the ON duration may be grouped into k groups and a search space set may be monitored in each group. The set of search spaces to monitor in each group may be indicated by the gNB or determined by the UE. For example, for each group, one bit may be used to indicate a first search space (e.g., Search Space 1) or a second search space (e.g., Search Space 2) to monitor. In some embodiments, the UE may feedback information to the gNB that may be used by the gNB to determine which search space sets to indicate for each slot group. For example, the UE may feedback the indices of the slots and/or slot groups in which sparser monitoring of the PDCCH may be used.

Figure 6A:
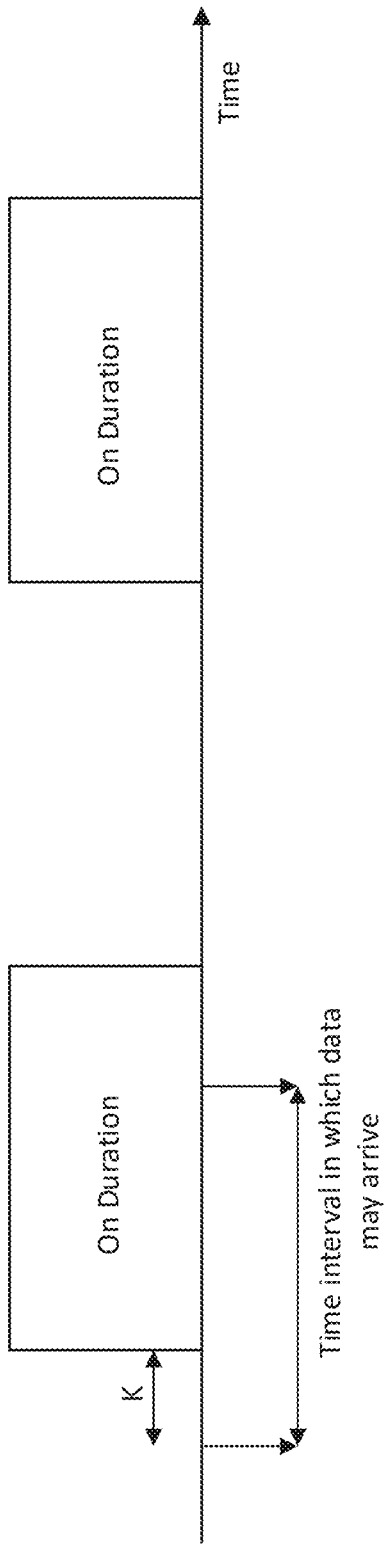
FIGS. 6A and 6B illustrate example time sequence diagrams of DRX cycles, in accordance with various embodiments of the present disclosure.
Figure 6B:
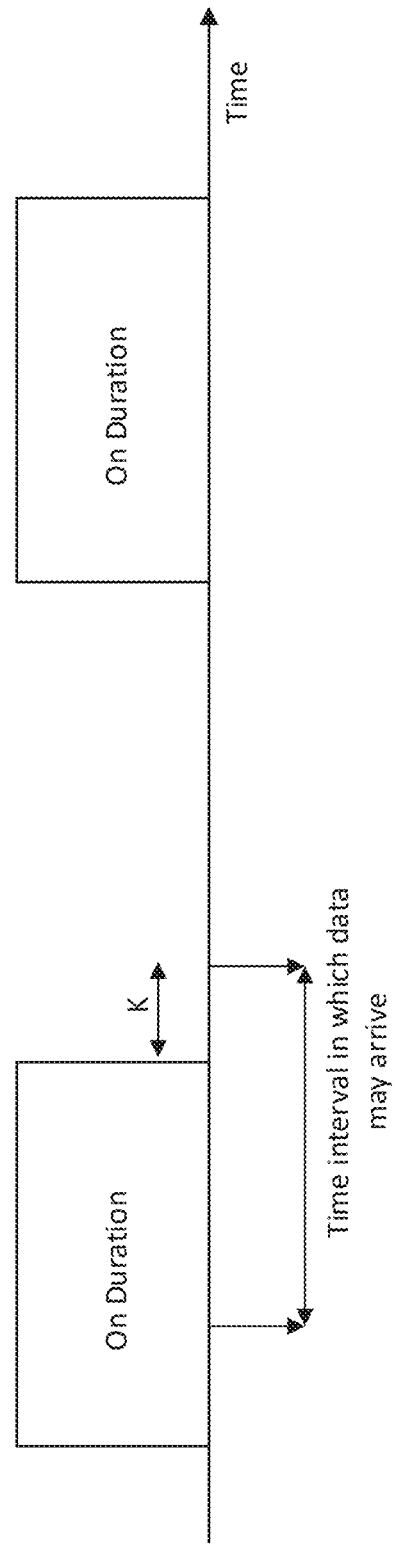

In some embodiments, the start time of the ON duration may be changed. The change may be indicated and/or determined as a shift in time, for example a positive shift or a negative shift. As an example, if the ON duration starts in slot n, after the shift, the ON duration may start at slot n+k or at slot n−k. The change may be indicated by the gNB in a DCI and/or a MAC CE and/or higher layer configuration. For example, a set of possible shifts may be configured and a codepoint in a DCI may indicate one of the configured shift values. FIG. 6(A) illustrates an example time sequence in which the ON duration may be shifted k ms to an earlier start time to align the ON duration with the expected data arrival interval. FIG. 6(B) illustrates an example time sequence in which the ON duration may be shifted k ms to a later start time to align the ON duration with the expected data arrival interval.

In some embodiments, the ON duration may be divided into at least two intervals and the value of the inactivity timer associated with each interval may be separate and/or different. For example, the inactivity timer may be started and/or restarted at least when a PDCCH is received in a specific interval within the ON duration.

In some embodiments, more than one DRX may be configured. In the following examples, two DRX cycles are used for illustration purposes. However, the disclosed embodiments may be similarly applicable to any number of DRX cycles. The terms DRX, DRX configuration, DRX functionality, and DRX cycle may be used interchangeably.

A DRX cycle may be activated and/or deactivated using L1 signaling and/or MAC CE. Activation may mean that UE is expected to monitor the PDCCH according to the requirements of an activated DRX configuration. Each DRX may be associated with a separate set of parameters. For example, each DRX may be configured with a separate DRX ON duration timer and an inactivity timer. Each DRX may be associated with a separate set of timers. In some embodiments, search spaces monitored according to each DRX may be different. For example, the UE may monitor search space set 1 while in Active Time according to DRX cycle 1, and the UE may monitor search space set 2 while in Active Time according to DRX cycle 2. In some embodiments, if the PDCCH is received according to search space set 1, timers associated with DRX 1 may be started and/or restarted, and if PDCCH is received according to search space set 2, timers associated with DRX 2 may be started and/or restarted.

In some embodiments, which DRX cycle to use and/or activate may be determined by at least one of a DCI type, RNTI, and a traffic flow index. The traffic flow index may be used to differentiate different types of traffic flow (e.g., video or voice). The traffic flow index may be determined by a MAC parameter (e.g., the logical channel, etc). In some embodiments, if the PDCCH is received in a slot associated with the Active Time of both DRX cycles, a preconfigured or predefined set of timers (e.g., the inactivity timer of the shorter DRX cycle) may be started or restarted.

In some embodiments, at least one bit in a DCI may be used to indicate to the UE to skip monitoring PDCCH until the end of a DRX cycle. The skipping indication may apply to the DRX cycle associated to the PDCCH in which the indication is received. For example, if the DCI is received in search space set 1, skipping may apply to DRX cycle 1. In some examples, the DRX cycle to which skipping applies may be indicated in the DCI with a codepoint. Example bits are shown below which may indicate the UE skipping monitoring of a downlink channel until the end of the corresponding DRX cycle, or may indicate the UE skipping a preconfigured duration. The skipping may apply only to certain search space types, for example, only to UE specific search spaces. Illustrated below are example bits that indicate whether a UE should skip monitoring a PDCCH:

Bits 00: Do not skip monitoring PDCCH
Bits 01: Skip monitoring PDCCH associated to DRX1 cycle (e.g., do not monitor SSs associated to DRX1)
Bits 10: Skip monitoring PDCCH associated to DRX2 cycle (e.g., do not monitor SSs associated to DRX2)
Bits 11: Skip monitoring PDCCH associated to both DRX cycle In some embodiments, the indication may indicate the DRX cycle to which the indication applies. An example indication is provided below:

Bits 00: Do not skip monitoring PDCCH
Bits 01: Skip monitoring PDCCH until the next DRX1 ON duration
Bits 10: Skip monitoring PDCCH until the next DRX2 ON duration
Bits 11: reserved In some embodiments, one bit or two codepoints in the DCI may indicate the DRX cycle to which the indication applies and the remaining bits/codepoints may indicate the skipping duration. One of the skipping values may indicate skipping until the end of the corresponding DRX cycle. For example, the first bit may indicate the DRX index as shown below:

Bits 00: Skip L1 slots in DRX 1
Bits 01: Skip L2 slots in DRX 1
Bits 10: Skip K1 slots in DRX 2
Bits 11: Skip K2 slots in DRX 2

Figure 7:
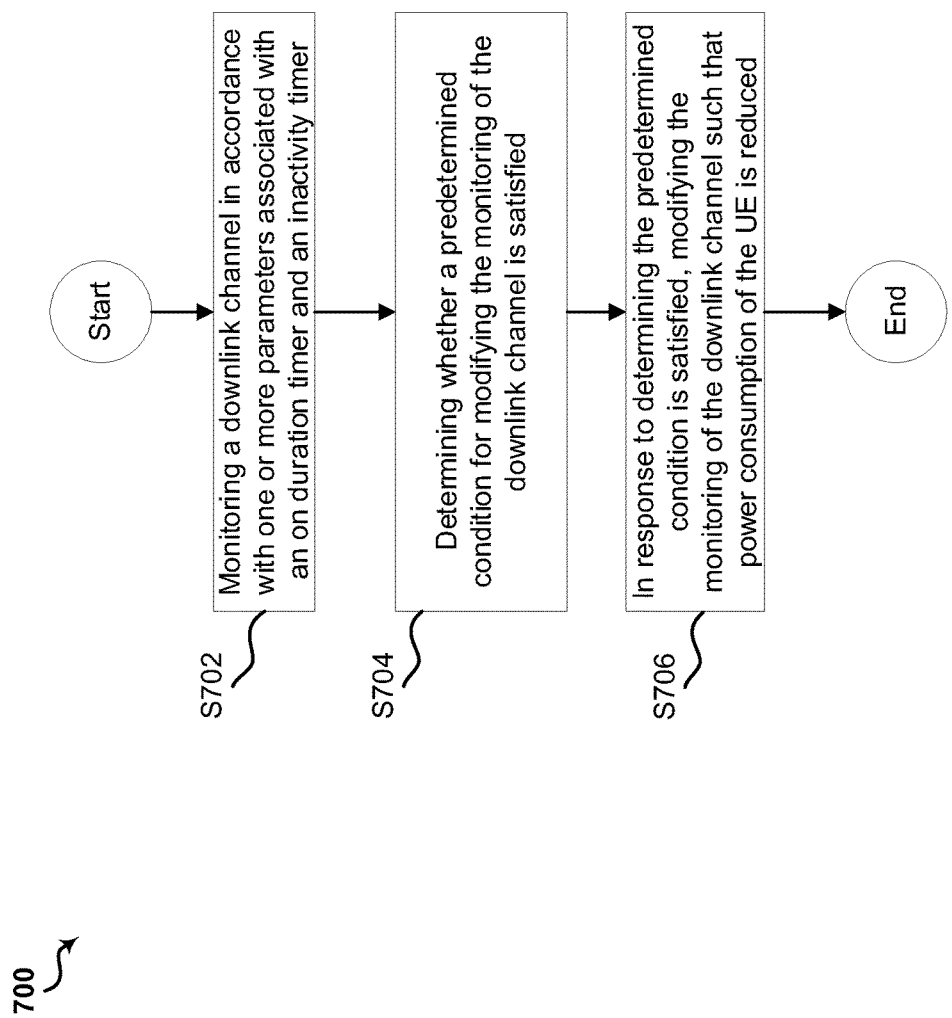
FIG. 7 a flow chart of an example power saving process, in accordance with various embodiments of the present disclosure.

FIG. 7 illustrates a flowchart of an embodiment of a process 700 for performing a power saving process. The process 700 may be performed by a UE. The process may start at operation S702 where the UE performs monitoring of a downlink channel in accordance with one or more parameters associated with an on duration timer and an inactivity timer. The on duration timer may specify a time period in which the UE monitors the downlink channel, and the inactivity timer may specify a time period in which the UE remains on after reception of downlink information in the downlink channel. The downlink channel may be the PDCCH. The process proceeds to operation S704 where the UE determines whether a predetermined condition for modifying the monitoring of the downlink channel is satisfied. For example, the UE may determine whether an indicator is received in the downlink channel that indicates whether the UE should modify the monitoring of the downlink channel. Furthermore, the condition may be based on a number of resources or type of resources received. The process proceeds to operation S706 where in response to determined condition is satisfied, the UE modifies the monitoring of the downlink channel such that power consumption of the UE is reduced. For example, the UE may perform early termination of the monitoring of the downlink channel or shift the timing of the monitoring of the downlink channel.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein. It is understood that the example embodiments are not limited thereto, and may be implemented in a variety of different architectures (e.g., bare metal architecture, any cloud-based architecture or deployment architecture such as Kubernetes, Docker, OpenStack, etc.).

The above disclosure also encompasses the embodiments listed below:

(1) A method performed by at least one processor in a user equipment (UE), including: monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel; determining whether a predetermined condition for modifying the monitoring of the downlink channel is satisfied; and in response to determining the predetermined condition is satisfied, modifying the monitoring of the downlink channel such that power consumption of the UE is reduced.

(2) The method according to feature (1), in which the predetermined condition specifies reception of an indicator in the downlink information for modifying one of the on duration timer and the inactivity timer.

(3) The method according to feature (2), in which the modifying one of the on duration timer and the inactivity timer includes starting one of the on duration timer and the inactivity timer upon reception of the indicator.
(4) The method according to feature (2), in which the modifying one of the on duration timer and the inactivity timer includes resetting one of the one of the on duration timer and the inactivity timer upon reception of the indicator.
(5) The method according to feature (2), in which the modifying one of the on duration timer and the inactivity timer includes changing a value of one of the on duration timer and the inactivity timer upon reception of the indicator such that a remaining time period of the one of the on duration timer and the inactivity timer is reduced.
(6) The method according to feature (5), in which the predetermined condition further specifies a resource threshold, in which the value of one of the on duration timer and the inactivity timer is changed in response to a determination that a number of resources received in the downlink channel is greater than or equal to the resource threshold.
(7) The method according to feature (1), in which the predetermined condition specifies a time threshold, in which in response to a determination that scheduled data is received in the downlink channel at a timing in which a remaining time period of the on duration timer is greater than or equal to the time threshold, the modifying one of the on duration timer and the inactivity timer includes reducing the remaining time period of the on duration time period.
(8) The method according to feature (1), in which the predetermined condition specifies a data threshold, in which in response to a determination that an amount of scheduled data received in the downlink channel is greater than or equal to the data threshold, the modifying one of the on duration timer and the inactivity timer includes setting the on duration timer to zero.
(9) The method according to feature (1), in which the predetermined condition is a data threshold, in which in response to a determination that an amount of scheduled data received in the downlink channel during the on duration timer or inactivity timer exceeds the data threshold, the modifying one of the on duration timer and the inactivity timer includes terminating whichever of the on duration timer and the inactivity timer is active.
(10) The method according to feature (1), further including: dividing an on duration time period into a plurality slots, each slot assigned to one of a first search space and a second search space, the first search space closer to a center of the on duration time period than the second search space, in which the predetermined condition specifies a reception of an indicator that indicates one of the first search space and the second search space, and in which the modifying one of the on duration timer and the inactivity timer includes monitoring one of the first search space and the second search space based on the indicator.
(11) The method according to feature (1), further including: dividing an on duration time period into a plurality slots, in which the predetermined condition specifies a reception of an indicator that indicates a shift in the on duration timer by a predetermined number of slots, and in which the modifying the one of the on duration timer and the inactivity timer includes shifting the on duration timer by the predetermined number of slots.
(12) The method according to feature (1), further including: dividing an on duration time period into a plurality of slots, in which each slot is associated with a separate inactivity timer, in which the predetermined condition specifies that upon reception of the downlink information in one of the slots of the plurality of slots, the inactivity timer corresponding to the one of the slots is started or restarted.
(13) The method according to feature (1), in which the monitoring the downlink channel includes monitoring the downlink channel in a plurality of discontinuous reception cycles (DRX), in which each DRX cycle in the plurality of DRX cycles is associated with a separate on duration timer and an inactivity timer.
(14) The method according to feature (13), in which the downlink channel is the physical downlink control channel (PDCCH), and in which the predetermined condition specifies that one of the on duration timer and the inactivity timer is started or restarted of the respective DRX cycle in which the PDCCH is received.
(15) The method according to feature (13), in which the downlink channel is the physical downlink control channel (PDCCH), and in which the predetermined condition specifies a reception of an indicator that indicates one of (i) do not skip monitoring the PDCCH, (ii) skip monitoring of the PDCCH of at least one DRX cycle in the plurality of DRX cycles, and (iii) skip monitoring of the PDCCH of each DRX cycle in the plurality of DRX cycles.
(16) The method according to feature (13), in which each DRX cycle in the plurality of DRX cycles is divided into a plurality of slots, and in which the predetermined condition specifies a reception of an indicator that indicates (i) at least one DRX cycle in the plurality of DRX cycles, and (ii) a number of slots to be skipped in the monitoring of the downlink channel.
(17) A user equipment (UE), including: at least one memory configured to store computer program code: and at least one processor configured to access said at least one memory and operate as instructed by the computer program code, the computer program code including: monitoring code configured to cause at least one of said at least one processor to monitor a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel, determining code configured to cause at least one of said at least one processor to determine whether a predetermined condition for modifying the monitoring of the downlink channel is satisfied, and modifying code configured to cause at least one of said at least one processor to, in response to determining the predetermined condition is satisfied, modify the monitoring of the downlink channel such that power consumption of the UE is reduced.
(18) The UE according to feature (17), in which the predetermined condition specifies reception of an indicator in the downlink information for modifying one of the on duration timer and the inactivity timer.
(19) The UE according to featured (18), in which the modifying code is further configured to cause at least one of said at least one processor to start one of the on duration timer and the inactivity timer upon reception of the indicator.

(20) A non-transitory computer readable medium having instructions stored therein, which when executed by a processor in a UE cause the processor to execute a method including: monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel; determining whether a predetermined condition for modifying the monitoring of the downlink channel is satisfied; and in response to determining the predetermined condition is satisfied, modifying the monitoring of the downlink channel such that power consumption of the UE is reduced.

What is claimed is:

1. A method performed by at least one processor in a user equipment (UE), comprising:
    monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel;
    determining whether a predetermined condition for modifying the monitoring of the downlink channel is satisfied; and
    in response to determining the predetermined condition is satisfied, modifying the monitoring of the downlink channel such that power consumption of the UE is reduced,
    wherein the predetermined condition specifies at least one of a resource threshold and a time threshold,
    wherein if the predetermined condition specifies the resource threshold, the monitoring of the downlink channel is modified based on a determination that a number of resources received in the downlink channel is greater than or equal to the resource threshold, and
    wherein if the predetermined condition specifies the time threshold, the monitoring of the downlink channel is modified based on a determination that scheduled data is received in the downlink channel at a timing in which a remaining time period of the on duration timer or the inactivity timer is greater than or equal to the time threshold, the time threshold being greater than 0.

2. The method according to claim 1, wherein the predetermined condition further specifies reception of an indicator in the downlink information for modifying one of the on duration timer and the inactivity timer.

3. The method according to claim 2, wherein the modifying one of the on duration timer and the inactivity timer includes starting one of the on duration timer and the inactivity timer upon reception of the indicator.

4. The method according to claim 2, wherein the modifying one of the on duration timer and the inactivity timer includes resetting one of the on duration timer and the inactivity timer upon reception of the indicator.

5. The method according to claim 2, wherein the modifying one of the on duration timer and the inactivity timer includes changing a value of one of the on duration timer and the inactivity timer upon reception of the indicator such that a remaining time period of the one of the on duration timer and the inactivity timer is reduced.

6. The method according to claim 5, wherein the predetermined condition specifies the resource threshold, wherein the value of one of the on duration timer and the inactivity timer is changed in response to a determination that the number of resources received in the downlink channel is greater than or equal to the resource threshold.

7. The method according to claim 1, wherein the predetermined condition specifies the time threshold, wherein in response to a determination that scheduled data is received in the downlink channel at a timing in which a remaining time period of the on duration timer is greater than or equal to the time threshold, the modifying one of the on duration timer and the inactivity timer includes reducing the remaining time period of the on duration timer.

8. The method according to claim 1, wherein the predetermined condition further specifies a data threshold, wherein in response to a determination that an amount of scheduled data received in the downlink channel is greater than or equal to the data threshold, the modifying one of the on duration timer and the inactivity timer includes setting the on duration timer to zero.

9. The method according to claim 1, wherein the predetermined condition further specifies a data threshold, wherein in response to a determination that an amount of scheduled data received in the downlink channel during the on duration timer or inactivity timer exceeds the data threshold, the modifying one of the on duration timer and the inactivity timer includes terminating whichever of the on duration timer and the inactivity timer is active.

10. The method according to claim 1, further comprising:
    dividing an on duration time period into a plurality slots, each slot assigned to one of a first search space and a second search space, the first search space closer to a center of the on duration time period than the second search space,
    wherein the predetermined condition further specifies a reception of an indicator that indicates one of the first search space and the second search space, and
    wherein the modifying one of the on duration timer and the inactivity timer includes monitoring one of the first search space and the second search space based on the indicator.

11. The method according to claim 1, further comprising:
    dividing an on duration time period into a plurality slots,
    wherein the predetermined condition further specifies a reception of an indicator that indicates a shift in the on duration timer by a predetermined number of slots, and
    wherein the modifying the one of the on duration timer and the inactivity timer includes shifting the on duration timer by the predetermined number of slots.

12. The method according to claim 1, further comprising:
    dividing an on duration time period into a plurality of slots,
    wherein each slot is associated with a separate inactivity timer,
    wherein the predetermined condition further specifies that upon reception of the downlink information in one of the slots of the plurality of slots, the inactivity timer corresponding to the one of the slots is started or restarted.

13. The method according to claim 1, wherein the monitoring the downlink channel includes monitoring the downlink channel in a plurality of discontinuous reception cycles (DRX), wherein each DRX cycle in the plurality of DRX cycles is associated with a separate on duration timer and an inactivity timer.

14. The method according to claim 13, wherein the downlink channel is a physical downlink control channel (PDCCH), and wherein the predetermined condition further specifies that one of the on duration timer and the inactivity timer is started or restarted of the respective DRX cycle in which the PDCCH is received.

15. The method according to claim 13, wherein the downlink channel is a physical downlink control channel (PDCCH), and wherein the predetermined condition further specifies a reception of an indicator that indicates one of (i) do not skip monitoring the PDCCH, (ii) skip monitoring of the PDCCH of at least one DRX cycle in the plurality of DRX cycles, and (iii) skip monitoring of the PDCCH of each DRX cycle in the plurality of DRX cycles.

16. The method according to claim 13, wherein each DRX cycle in the plurality of DRX cycles is divided into a plurality of slots, and wherein the predetermined condition specifies a reception of an indicator that indicates (i) at least one DRX cycle in the plurality of DRX cycles, and (ii) a number of slots to be skipped in the monitoring of the downlink channel.

17. A user equipment (UE), comprising:
  at least one memory configured to store computer program code; and
  at least one processor configured to access said at least one memory and operate as instructed by the computer program code, the computer program code including:
    monitoring code configured to cause at least one of said at least one processor to control to monitor a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel,
    determining code configured to cause at least one of said at least one processor to determine whether a predetermined condition for modifying the monitoring of the downlink channel is satisfied, and
    modifying code configured to cause at least one of said at least one processor to, in response to determining the predetermined condition is satisfied, modify the monitoring of the downlink channel such that power consumption of the UE is reduced,
  wherein the predetermined condition specifies at least one of a resource threshold and a time threshold,
  wherein if the predetermined condition specifies the resource threshold, the monitoring of the downlink channel is modified based on a determination that a number of resources received in the downlink channel is greater than or equal to the resource threshold, and
  wherein if the predetermined condition specifies the time threshold, the monitoring of the downlink channel is modified based on a determination that scheduled data is received in the downlink channel at a timing in which a remaining time period of the on duration timer or the inactivity timer is greater than or equal to the time threshold, the time threshold being greater than 0.

18. The UE according to claim 17, wherein the predetermined condition further specifies reception of an indicator in the downlink information for modifying one of the on duration timer and the inactivity timer.

19. The UE according to claim 18, wherein the modifying code is further configured to cause at least one of said at least one processor to start one of the on duration timer and the inactivity timer upon reception of the indicator.

20. A non-transitory computer readable medium having instructions stored therein, which when executed by a processor in a UE cause the processor to execute a method comprising:
  monitoring a downlink channel in accordance with one or more parameters associated with an on duration timer and an inactivity timer, the on duration timer specifying a time period in which the UE monitors the downlink channel, the inactivity timer specifying a time period in which the UE remains on after reception of downlink information in the downlink channel;
  determining whether a predetermined condition for modifying the monitoring of the downlink channel is satisfied; and
  in response to determining the predetermined condition is satisfied, modifying the monitoring of the downlink channel such that power consumption of the UE is reduced,
  wherein the predetermined condition specifies at least one of a resource threshold and a time threshold,
  wherein if the predetermined condition specifies the resource threshold, the monitoring of the downlink channel is modified based on a determination that a number of resources received in the downlink channel is greater than or equal to the resource threshold, and
  wherein if the predetermined condition specifies the time threshold, the monitoring of the downlink channel is modified based on a determination that scheduled data is received in the downlink channel at a timing in which a remaining time period of the on duration timer or the inactivity timer is greater than or equal to the time threshold, the time threshold being greater than 0.

* * * * *